(12) United States Patent
Ruiz et al.

(10) Patent No.: US 9,820,099 B2
(45) Date of Patent: Nov. 14, 2017

(54) ELECTRONIC BEACON READER SYSTEM AND METHOD

(71) Applicant: Electronic Beacons Systems LLC, Kansas City, MO (US)

(72) Inventors: Jonathan A. Ruiz, Kansas City, MO (US); Brendan W. Waters, Kansas City, MO (US); William G. Waters, Parkville, MO (US)

(*) Notice: Subject to any disclaimer, the term of this patent is extended or adjusted under 35 U.S.C. 154(b) by 0 days.

(21) Appl. No.: 15/438,473

(22) Filed: Feb. 21, 2017

(65) Prior Publication Data

US 2017/0245110 A1   Aug. 24, 2017

Related U.S. Application Data

(60) Provisional application No. 62/297,499, filed on Feb. 19, 2016.

(51) Int. Cl.
| | | |
|---|---|---|
| G08B 5/22 | (2006.01) |
| G08B 25/00 | (2006.01) |
| H04W 4/02 | (2009.01) |
| H04L 29/08 | (2006.01) |
| G06K 17/00 | (2006.01) |
| H04W 4/00 | (2009.01) |
| H04W 8/00 | (2009.01) |

(52) U.S. Cl.
CPC ........ *H04W 4/023* (2013.01); *G06K 17/0022* (2013.01); *H04L 67/12* (2013.01); *H04W 4/008* (2013.01); *H04W 8/005* (2013.01); *G06K 2017/0045* (2013.01)

(58) Field of Classification Search
CPC ..... H04W 4/023; H04W 4/008; H04W 8/005; H04L 67/12; G06K 17/0022; G06K 2017/0045
USPC ........................................................ 375/370
See application file for complete search history.

(56) References Cited

U.S. PATENT DOCUMENTS

| | | |
|---|---|---|
| 8,994,645 B1 | 3/2015 | Meehan |
| 9,380,421 B1 | 6/2016 | Vltavsky |
| 9,408,036 B2 | 8/2016 | Hart et al. |
| 9,485,603 B2 | 11/2016 | Worrall et al. |
| 9,494,674 B2 | 11/2016 | Messier et al. |
| 9,503,620 B2 | 11/2016 | Konrad et al. |

(Continued)

*Primary Examiner* — Nader Bolourchi
(74) *Attorney, Agent, or Firm* — Law Office of Mark Brown, LLC; Mark E. Brown

(57) ABSTRACT

A system and method for deploying and reading data from sensors or electronic beacons to create a sensor rich, Internet of Things environment. A beacon reader embodying an aspect of the present invention includes a computing chip, a Bluetooth or other radio frequency (RF) module, and an internet connectivity module. The beacon reader is configured for use with Bluetooth beacons or other RF transmitting devices or sensors, Wi-Fi transmitting devices, a network-connected database, a real time analytics engine configured for performing real time analysis and allowing bidirectional communication and information exchange, a network-connected computing device having a display, and a user interface. The beacon reader is configured to assign identifying information to the Bluetooth beacons or other RF transmitting devices; scan for and collect data from the beacons or transmitting devices; trigger proximity and/or data driven events; and send data to the database viewable in the user interface.

18 Claims, 5 Drawing Sheets

(56) References Cited

U.S. PATENT DOCUMENTS

| | | |
|---|---|---|
| 9,514,630 B1 | 12/2016 | Steven |
| 9,516,474 B2 | 12/2016 | Finnerty et al. |
| 2013/0065584 A1* | 3/2013 | Lyon .................... H04W 28/06 455/434 |
| 2015/0382150 A1* | 12/2015 | Ansermet .......... G06Q 10/0639 455/41.1 |
| 2016/0174022 A1 | 6/2016 | Nhu |
| 2016/0232771 A1 | 8/2016 | Mendiola et al. |

* cited by examiner

ELECTRONIC BEACON READER SYSTEM AND METHOD

CROSS-REFERENCE TO RELATED APPLICATION

This application claims priority in U.S. Provisional Patent Application No. 62/297,499, filed Feb. 19, 2016, which is incorporated herein by reference.

BACKGROUND OF THE INVENTION

1. Field of the Invention

The present invention relates to a system and method for creating a connected "Internet of Things" environment or infrastructure via the use of Bluetooth beacons or radio frequency sensors. More particularly, the present invention relates to assigning identifiers to Bluetooth beacons or radio frequency sensors which each represent a person, place, or thing; collecting data based on proximity to the invention; and sending the data to a network-connected database.

2. Description of the Related Art

Currently, most technologies used to create connected, sensor rich environments utilize near-field radio frequency sensors, which require integration into existing infrastructures and Internet access points. These technologies involve extensive installation to integrate within existing infrastructures as they relate to a specific industries or use-cases, and thus they can be expensive to set-up and use. One such example is an access control system that uses radio frequency identification (RFID), a type of near-field radio frequency, to identify and track people throughout a building. Considerable installation and integration into building infrastructure, such as physical installation into walls and/or doors, access to power lines, access to network lines, etc., is required for such a system, prohibiting it from being quickly deployed and making it costly. Each system must be customized using various sensors and equipment as it relates to certain industries or applications.

Additionally, systems deploying near-field sensors lose a level of granularity because near-field sensors require physical touch or near-touching points to create or trigger events. Near-field radio frequency sensors typically have a maximum working range of less than 20 centimeters, with an optimum range of four centimeters or less. In contrast, Bluetooth low energy (BLE) beacons have a much larger range. BLE beacons also provide faster speeds, quicker set-up time, and higher transfer rates than near-field sensors.

Sensor rich environments with near-field radio frequency sensors commonly utilize a mesh network method for sending data to a database. A mesh network requires a plurality of radio nodes arranged in a network which relay device data from node to node to a central, internet-connected hub. The central hub then transfers the data to a database. In contrast, a sensor rich environment with network-connected reading devices having computing capabilities allows for data to be reported to a database in real time and eliminates some room for error by not requiring the relay of data from node to node. Additionally, such readers allow for an Internet of Things or "smart" environment to be created with merely one reader and sensors rather than requiring a network of radio nodes to work properly and add value.

One or more beacon readers, Bluetooth beacons or other radio frequency sensors, and a web interface of the present invention allow for fast, extensive, easily deployed, sensor rich systems for use in various environments without requiring significant infrastructure modifications or integrations.

SUMMARY OF THE INVENTION

The present invention covers a system and method for deploying and reading data from electronic beacons or radio frequency transmitting devices to create an Internet of Things or smart environment. An embodiment of a beacon reader of the present invention is a network-connected device including a computational circuit board; a Bluetooth or radio frequency module; and a network connectivity module. The beacon reader is further configured to run software designed to assign unique identifying information to Bluetooth beacons or radio frequency sensors; scan for and collect data from Bluetooth beacons or sensors and/or other radio frequency-based sensors; trigger proximity and/or data driven events; and send data to a network-connected database to be used in a user interface. The beacon readers and beacons or sensors of the present invention can be powered by batteries or USB-ports, allowing for added versatility of the system. Each beacon reader can connect to the internet via an Ethernet port, Wi-Fi, or an embedded cell or data chip, which allows the system to be deployed and to report data to a web portal nearly anywhere.

BRIEF DESCRIPTION OF THE DRAWINGS

The drawings constitute a part of this specification and include exemplary embodiments of the present invention illustrating various objects and features thereof.

DETAILED DESCRIPTION OF THE PREFERRED EMBODIMENTS

I. Introduction and Environment

Figure 1:
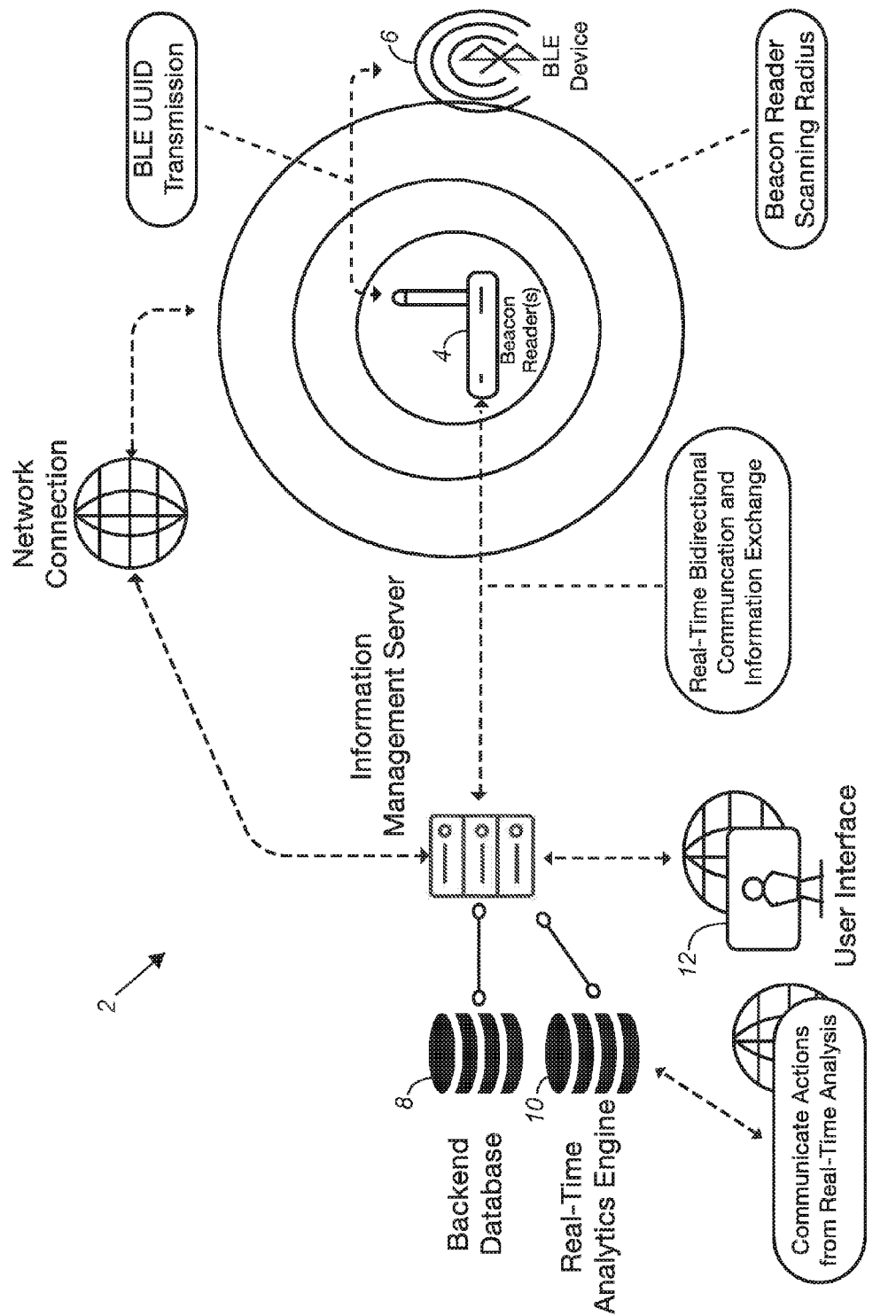
FIG. 1 is a block diagram of a sensor rich environment embodying an aspect of the present invention.

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right, and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof and words of similar meaning.

II. Preferred Embodiment

An embodiment of the present invention comprises a system and process for using one or more beacon readers and Bluetooth beacons or other radio frequency transmitting devices or sensors to create a comprehensive Internet of Things (IoT), or "smart," environment adaptable for many different industries and uses. An Internet of Things environment is a sensor rich system of network-connected components able to collect and exchange data using integrated sensors. Beacon readers of an exemplary embodiment of the present invention each include a Bluetooth or other radio frequency module, a network connectivity module, a computing chip, and a power source.

A beacon reader Bluetooth module is configured to allow scanning for, communication with, and modification of Bluetooth-enabled devices by transmitting and receiving Bluetooth radio frequencies. In a preferred embodiment of the present invention, the beacon reader's Bluetooth module is configured for communicating with Bluetooth low energy (BLE), also known as "Bluetooth Smart," devices by broadcasting and receiving BLE radio frequencies. Bluetooth low energy frequencies provide similar communication ranges to classic Bluetooth with considerably reduced power consumption. The Bluetooth module can be configured for use with iBeacon, Eddystone, Estimote, Sensoro, Radius Networks, or any other BLE protocol. Currently, Bluetooth is the most widely adopted form of radio frequency (RF) technology in mainstream consumer applications. For instance, all new smart phones and many other smart devices (e.g., AppleWatch, FitBit) have Bluetooth low energy capabilities, but many do not support RFID. Thus, beacon readers having Bluetooth modules configured for communicating with BLE devices creates greater potential for applications involving and integration with other consumer devices. Alternatively, the beacon reader Bluetooth module can be configured to communicate with classic Bluetooth devices by transmitting and receiving classic Bluetooth frequencies. Further alternative embodiments of beacon readers may include a radio frequency (RF) module configured to communicate with different types of radio frequency-enabled devices (e.g., RFID, LoRaWAN, Wi-Fi) by transmitting and receiving other radio frequencies in place of or in addition to a Bluetooth module.

The network connectivity module allows the beacon reader to connect to a network and send data to a database in real time. Most commonly, the network connectivity module is configured for connecting to the internet or cloud. However, the present invention can also be configured for local hosting with the network connectivity module configured for connecting to an intranet, such as a local area network (LAN). The network connectivity module may be a Wi-Fi module, an Ethernet port, a GSM module, a LTE module, or any other type of cell or data chip for allowing network access. Internet connection for each beacon reader provides enhanced reliability over mesh networks, which require the relay of data across multiple radio nodes, and allows for real time data reporting. However, constant network connectivity is not required for the beacon reader system to properly function. Without a network connection, beacon or sensor data will not be sent to a database in real time. Rather, the data can be configured to be transmitted from the beacon reader to a database at one time when a network connection is established.

Each beacon reader includes a computer processing chip, or electronic circuit board, configured to run firmware and software which allows the device to scan for Bluetooth or other radio frequency devices and send relevant information to a database via the network. The computing chip of the present invention is more sophisticated—being capable of running the aforementioned firmware and software—than computing chips used by other Internet of Things systems which simply relay information to a main computing hub rather than directly to a database. The combination of network connectivity, the computing chip, and software allows the present invention to lessen the room for error in relaying information to the database, compute in real time, and allow for an Internet of Things environment to be set up with one beacon reader rather than needing multiple nodes. The system further includes a real time analytics engine connected to the database and the beacon reader via the network. Such a real time analytics engine or processor performs real time analysis of data from the beacon reader, communicates actions from real time analysis, and allows for real time, bidirectional communication and information exchange between the beacon reader and the database.

The beacon reader is preferably powered through a USB port. However, alternative embodiments can be powered by battery or by another power source. Additional USB ports may optionally be included in beacon readers of the present invention. Along with simple powering, the one or more USB ports allow for optional extension and modification of the beacon reader devices. USB ports could be used for additional antennas to increase bandwidth of the system and/or provide added communication functionalities. Such additional antennas could be for Bluetooth, Wi-Fi, LTE, GSM, LoRaWAN, etc. Adding a Wi-Fi module to a beacon reader USB port enables an extra feature of the beacon reader. The second Wi-Fi module allows the beacon reader to passively scan for any Wi-Fi connected devices, in addition to Bluetooth devices, within its proximity and send device count data to the database in real time. USB ports could further support external battery power sources.

In one preferred embodiment, one or more beacon readers are used in combination with Bluetooth low energy (BLE) beacons. BLE beacons are low cost, low energy Bluetooth devices, which each broadcast, or transmit, a universally unique identifier (UUID) and are programmable with additional identifying information. In this embodiment, each beacon reader is configured to identify each beacon within range by its UUID along with additional programmed data. BLE beacons are most commonly battery-powered, but alternatively, they could be powered through a USB port. BLE standard frequencies do not require much energy expenditure, allowing BLE beacons to have a long battery life. For instance, a simple watch battery can power a beacon for approximately a year.

BLE beacons can broadcast Bluetooth signals up to 100 meters. However, each beacon can be programmed to adjust its broadcast range between near-field ranges and higher ranges, as desired for its application of use. In contrast to RFID and other RF technologies, BLE beacons each have an active broadcast signal at the desired range, allowing for smooth, real time applications. Beacons can further be programmed to include information from other sensors in their broadcast signals. Onboard sensors, including but not limited to temperature and humidity sensors, can easily be paired with a BLE beacon. The beacon's UUID can be programmed with the sensor data added and broadcast in unison. The ability to pair with other sensors provides beacons with more versatility compared to RFID. Additionally, BLE beacons can be adapted for many different forms. In one form, beacons can be placed in a stationary location. Such stationary beacons can be paired with a plurality of other sensors, as mentioned above. BLE beacons can be configured to be in tag or card form, which allows them to be attached to people, objects, assets, key rings, badges, etc. BLE beacons can also be configured to be in wearable forms such as bracelets, necklaces, hats, etc. In alternative embodiments, the present invention can be configured for use with classic Bluetooth frequencies and beacons or other RF technologies and sensors, such as RFID technology and sensors, rather than BLE frequencies and BLE beacons.

The present invention further includes a network-connected computing device with a display. This computing device could be a laptop computer, a desktop computer, a smart phone, a tablet, a smart device, or any other network-connected computing device having a display. The computing device can be connected to the network via Wi-Fi, an Ethernet connection, GSM, LTE, or any other type of network connection. The computing device is configured for connection to a database which receives data from the one or more beacon readers via the network in real time and a real time analytics engine. The computing device is further configured for compatibility with and for displaying a user interface connected to the database. The user interface is configured to allow the assignment of identifying information to beacons and beacon readers and to set and modify parameters for the system. The interface displays beacon information as each beacon relates to proximity to a beacon reader and real time analysis from the analytics engine. The user interface is further configured to allow an authorized user to create and assign identifying information to a previously unregistered beacon.

An exemplary embodiment of a user interface of the present invention includes a card-based dashboard which displays information about a beacon reader's location and Bluetooth beacons within its proximity. This embodiment of the user interface further includes a map display which shows where all the beacon readers in the system are physically located and a snapshot of activity at each location, such as beacon count. If the beacon readers include Wi-Fi module extensions, the map feature can further display a Wi-Fi device count in proximity of each beacon reader. Another feature of this user interface embodiment is a live analytics line chart which shows the Wi-Fi device count activity for each beacon reader which includes a Wi-Fi module extension. Similarly, a live analytics line chart can be configured to show beacon or sensor count activity within range of each beacon reader. Alternative embodiments of the user interface can be adapted to include different layouts and features for displaying information of the Internet of Things environment. Embodiments can include all, none, or any combination of the aforementioned interface features, as desired for the particular application of the present invention. The user interface may include required password logins and/or other security measures for access.

Preferably, the user interface of the present invention includes user-friendly variations for use with different types of computing devices. An embodiment of the user interface is configured to be opened in a wide variety of web browsers, including mobile browsers. This allows the interface to be viewed on any internet-connected computing device with a display. A variation of the user interface is configured to be accessed via a dedicated mobile application compatible with smart phones and tablets. The mobile application can be configured for use with IOS, Android, or any alternative smart phone and tablet operating system.

Figure 2:
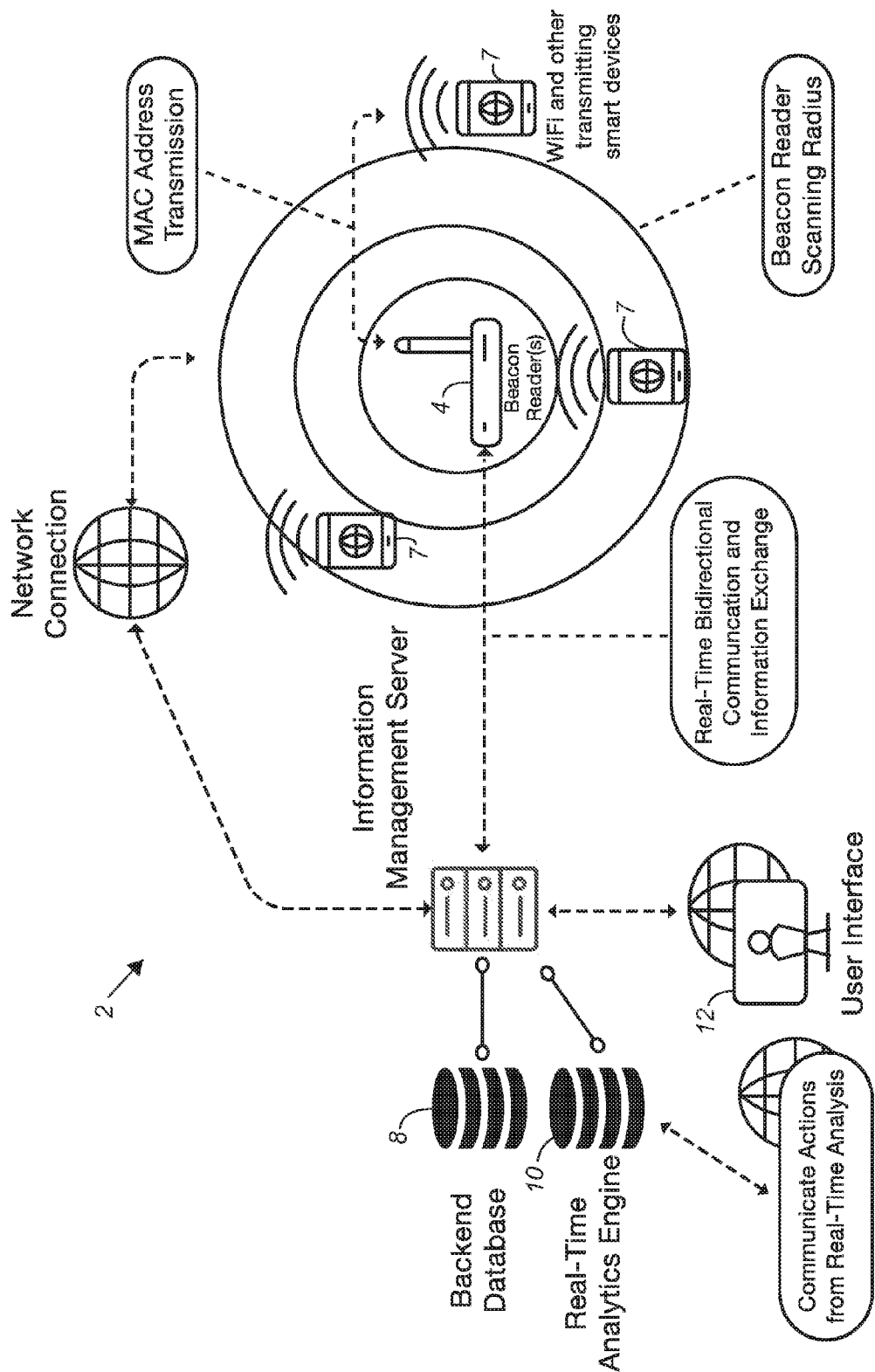
FIG. 2 shows a block diagram of another aspect of a sensor rich environment of the present invention.

Referring to the drawings in more detail, FIGS. 1-2 show block diagrams of an embodiment of a sensor rich, Internet of Things system 2 of the present invention. The system 2 includes a beacon reader 4 having a scanning radius covering all of or a defined portion of an area to be managed. As shown in FIG. 1, the beacon reader 4 is configured to identify and communicate with any BLE devices 6 within range of the beacon reader 4 scanning radius. Each BLE device 6 transmits its UUID along with any additional programmed identifying information, and the beacon reader 4 is configured to receive this BLE device 6 data. The beacon reader 4 is further configured to connect to a network and communicate with a network-connected information management server including a backend database 8 configured for storing beacon reader 4 data and a real time analytics engine 10, or processor, configured to perform real time analysis of data from the beacon reader 4, communicate actions from real time analysis, and allow for real time, bidirectional communication and information exchange between the beacon reader 4 and the server. The sensor rich system 2 further includes a network-connected computing device including a processor and a display configured to connect to the server via the network and configured for displaying a user interface 12 to a user. The user interface 12 is configured to display BLE device 6 data sent from the beacon reader 4 and stored in the database 8 and to display real time system analysis. The user interface 12 further allows a user to input information and/or system controls to the beacon reader 4. Such a system 2 can be set-up with one beacon reader 4 or expanded with multiple beacon readers 4, each with their own scanning radius.

FIG. 2 shows another aspect of the sensor rich environment 2. In this embodiment, the beacon reader 4 is further configured for identifying and communicating with smart devices 7 which transmit Wi-Fi or other radio frequencies. Each smart device 7 transmits its media access control (MAC) address along with any other programmed information, and the beacon reader 4 is configured to receive this data. The beacon reader 4 sends this smart device 7 data to the information management server in real time, and this data and real time analysis is displayed to a user via the user interface 12.

To set up an embodiment of an Internet of Things environment of the present invention, one or more beacon readers are first connected to a power source and connected to the network, which could be the internet or an intranet. The beacon reader user interface is accessed by an authorized user on a network-connected computing device connected to the database and the real time analytics engine. Using the user interface, the user can assign identifying information to the one or more beacon readers being used in relation to the application or use-case. This identifying information may include the physical location of the beacon reader device and the area within its scanning radius. Additional identifying information for the beacon reader can be customized as desired depending on the particular application of the system.

The user then places one or more BLE beacons or sensors in proximity to a beacon reader, and the beacon reader connects to the BLE beacons or sensors via Bluetooth. Alternatively, beacon readers of the present invention can be configured to communicate with other RF devices by connecting to RF transmitting devices or sensors via other radio frequencies. In this embodiment, the beacon reader displays data related to the connected BLE beacons or sensors, via the user interface, and the data is sent back to a cloud database. The interface is configured to first display the beacon or sensor data of the beacon or sensor which is in closest proximity to the beacon reader. So, placing a BLE beacon or sensor on top of or in closest proximity to the beacon reader will display that particular beacon or sensor's data first. However, the user interface is capable of displaying beacon or sensor data for any beacon or sensor within range of the beacon reader. If a BLE beacon or sensor is unknown in the system, a data entry screen is configured to be presented to the user on the user interface. The user then assigns relevant identifying information to the beacon as it relates to the particular application of the system. This identifying information includes whether the BLE beacon or sensor represents a person, place, or thing. The user can create custom identifier fields based on the particular use for added data collection granularity and to trigger specific proximity-based events when beacons come in proximity to particular beacon readers or stationary beacons. The beacon reader is configured to report all data created by every sensor present in each BLE beacon. The user can define what sensor data to display in the user interface, depending on relevance to the particular application of the system. If the BLE beacons or sensors are battery powered, the beacon reader will report battery life information on the user interface for all BLE beacons within range.

The beacon readers are placed in desired positions, and BLE beacons are assigned to particular persons, places, or things by an authorized user. The beacon readers communicate with the beacons and send information to the database and real time analytics engine in real time. The user monitors the relevant beacon information and analysis from the beacon readers and analytics engine on the computing device display via the user interface. Using the present invention, the user can manage the Internet of Things environment accordingly based on location data, proximity-based triggers, and/or other relevant beacon reader information. In an exemplary embodiment, a user configures data collection and event triggering, parameter-based, identifying information to assign to the beacon reader and the BLE beacons or sensors. The beacon reader is configured to log every time a BLE beacon enters and leaves its scanning radius. It will also log any specified sensor information upon a BLE beacon or sensor entering the scanning radius. The beacon reader, in this embodiment, is also configured to log the elapsed time that the BLE beacon remains in the scanning radius. The beacon reader system of the present invention is designed to be adaptable for many different set-ups and industries. The specific example applications mentioned in this document are merely example embodiments and should not be considered limiting in any way.

Figure 3:
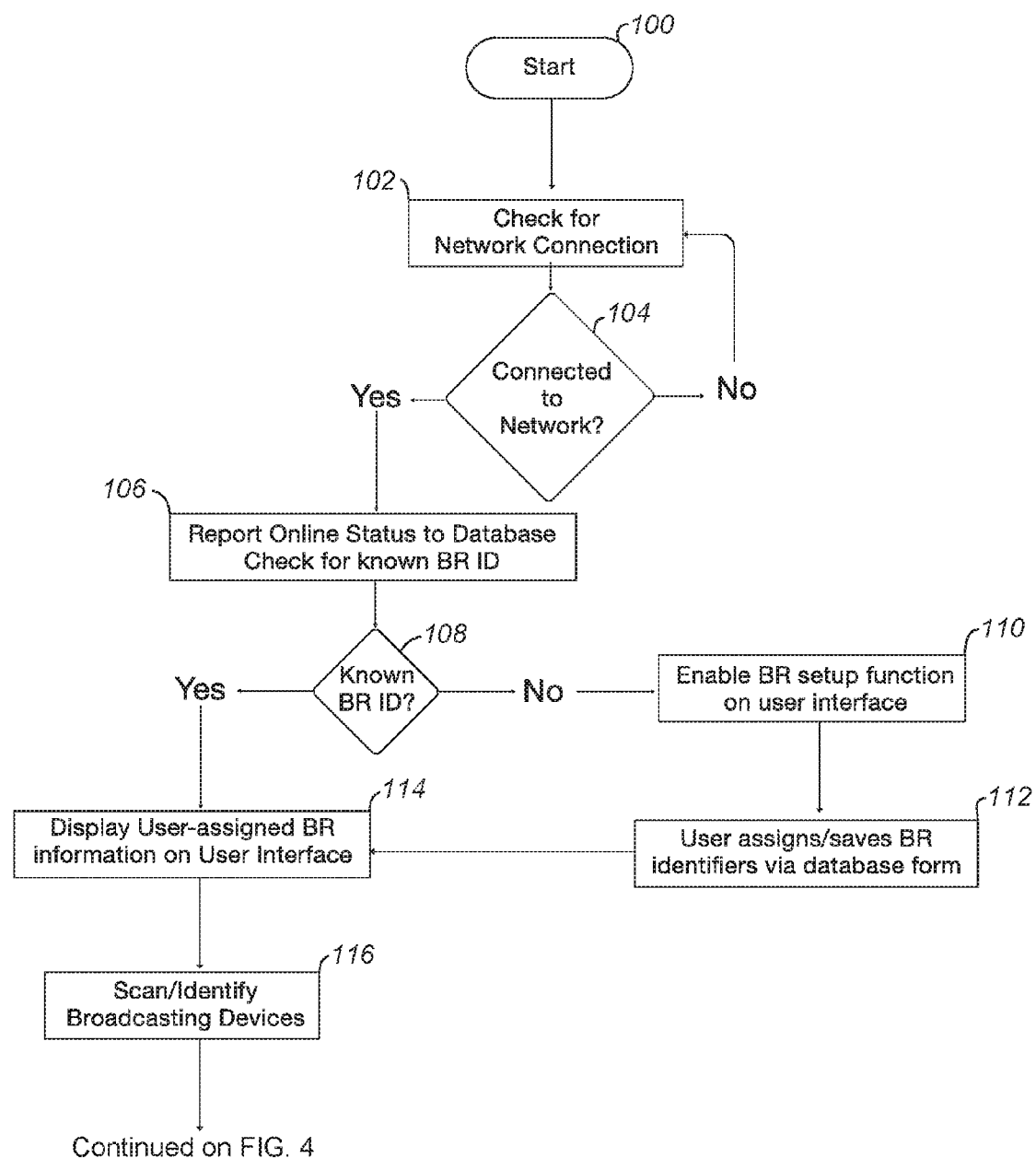
FIGS. 3-5 show a flowchart illustrating a method of assigning identifying information to and tracking devices in a sensor rich environment embodying the present invention.
Figure 4:
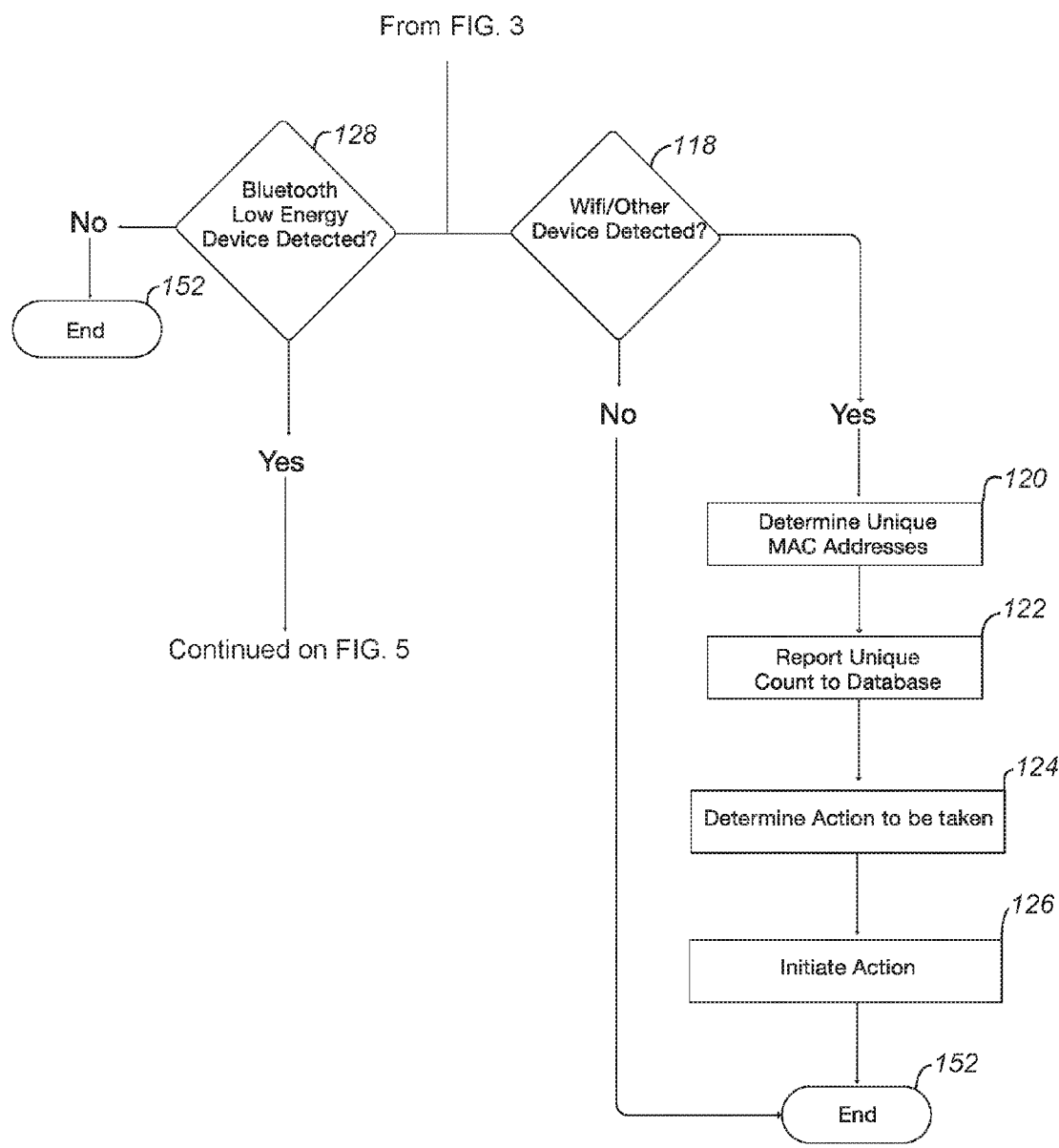
Figure 5:
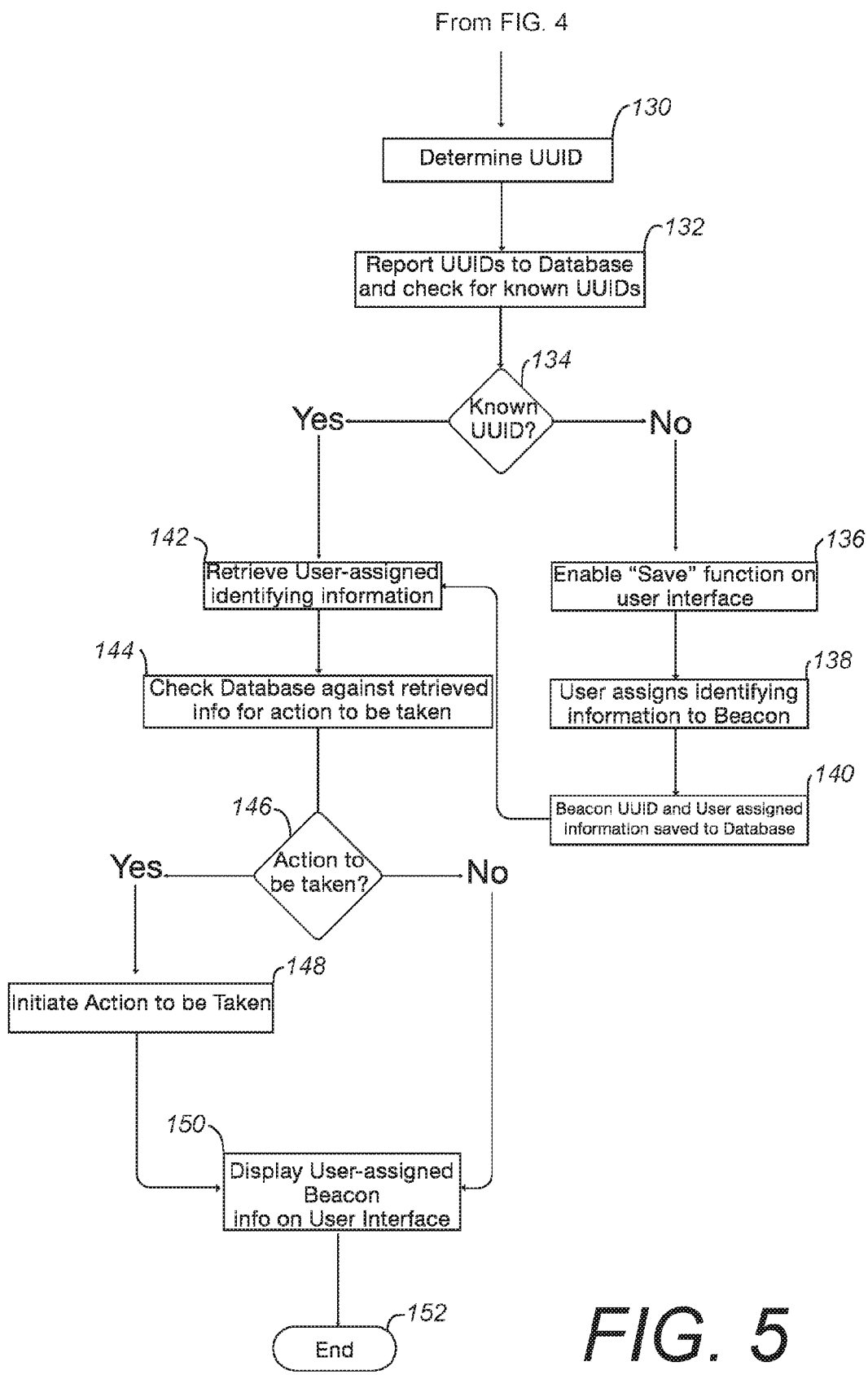

FIGS. 3-5 show a flowchart which illustrates a method of using an embodiment of a sensor rich environment of the present invention to assign identifying information and to track devices within an area to be managed, starting at step 100. A user begins by powering on a computing device and checking for a network connection, at step 102. If the computing device is not connected to the network at step 104, the user will continue to check for a network connection until a connection is established. Once connected to the network, the user proceeds to step 106, opening the user interface to report the computing device's online status and to initiate scanning for beacon reader identifying information. At step 108, the system determines if detected beacon reader identifying information is known or recognized by the database. If the beacon reader is known, the process proceeds to step 114, and previous user-assigned beacon reader information is displayed on the user interface. If a beacon reader is not known by the system at step 108, a beacon reader set-up function is enabled on the user interface at step 110. At step 112, the user assigns beacon reader identifiers, saves them to the database via the user interface, and proceeds to step 114. Once beacon reader information is displayed on the user interface, the beacon reader is configured to scan for and identify broadcasting devices at step 116.

If one or more Wi-Fi-enabled or other radio frequency-enabled smart devices are detected within range of the beacon reader at step 118, the beacon reader determines the unique MAC address of each smart device at step 120. Next, at step 122, the beacon reader reports a count of unique MAC addresses to the database. The database then, at step 124, determines what action, if any, is to be taken in response to the MAC address count. At step 126, the appropriate action is taken by the user and/or beacon reader, and the process ends at step 152. If no Wi-Fi-enabled or other radio frequency-enabled smart devices are detected at step 118, the process ends at step 152.

If one or more Bluetooth Low Energy (BLE) devices, or beacons, are detected at step 128, the beacon reader determines the UUID of each BLE device at step 130. The beacon reader then reports the BLE device UUIDs to the database, and the database checks for stored UUID information at step 132. If the database recognizes a UUID at step 134, the process proceeds to step 142, and the database retrieves previous user-assigned BLE device identifying information. If the database does not have stored data associated with a detected UUID at step 134, the database enables a "Save" function on the user interface at step 136. At step 138, the user then assigns identifying information to the BLE device. The BLE device UUID and user-assigned information is saved to the database at step 140, and the process goes on to step 142. At step 144, based on the retrieved BLE device information, the database determines if there is an action to be taken. If at step 146, there is no action to be taken, the process proceeds to step 150, and the user-assigned BLE device information is displayed on the user interface. If there is an action to be taken at step 146, the user and/or beacon reader initiate the action to be taken at step 148. Then, the user-assigned BLE device information is displayed on the user interface at step 150, and the process ends at step 152. If no BLE devices are detected at step 128, the process ends at step 152.

III. Access Management

An exemplary application of the present invention is use for monitoring access to restricted areas of a property or location to be managed. In this embodiment, a main beacon reader and an inventory of BLE beacons are positioned central location in relation to the area to be managed, such as a reception area or a security guard or gate house at the entrance of an area. Sub-beacon readers are positioned throughout the area to be managed, and an administrative user, such as a security guard, receptionist, or property manager, creates proximity-based triggers via the user interface upon installation of the sub-beacon readers. Identifiers assigned to BLE beacons are configured to trigger alerts on the user interface based on authorization access as the beacons come into proximity of a sub-beacon reader.

In this embodiment, the administrative user accompanies the main beacon reader, the inventory of BLE beacons, and a network-connected computing device with a display capable of accessing the user interface. Upon entry to the area being managed, a guest provides the administrative user with identifying information. Depending on the type of property being managed, the guest identification information may include, but is not limited to, first and last name, purpose of entry or visit, and vehicle information. The administrative user then places a BLE beacon without existing guest information in close proximity to the main beacon reader, triggering a data entry screen on the user interface. The administrative user enters the aforementioned guest identifying information and assigns an access authorization identifier to the BLE beacon relating to access authorization identifiers of the sub-beacon readers within the managed area. The administrative user assigns the beacon to the guest and instructs the guest to carry or wear the beacon on their person at all times while they are in the managed area.

Based on the authorization access identifier assigned to the BLE beacon, certain events may be triggered when the beacon comes in proximity of a beacon reader. The administrative user then manages the area in accordance with those beacon reader triggers. A guest returns the BLE beacon to the administrative user upon departure from the area being managed, and the administrative user clears the guest's identifying information from the beacon. Employees or residents of the managed area may be each assigned a BLE beacon with their identifying information and an appropriate authorization access identifier for the duration of their employment or residence at the managed area.

A specific example of an access management use of the present invention would be a guest checking into a building having a receptionist or security officer. Upon check-in, the receptionist or security guard assigns a BLE beacon to the guest. If the guest then enters a restricted area of the building that is off-limits to the guest, an alert comes up on the user interface on the receptionist or security guard's computing device.

A further example is a gated community with a security guard responsible for managing and recording who enters the community. Residents of the community would be given a BLE beacon having no limitations relating to authorized access to the managed community. Resident beacons would simply notify the security guard that the resident may enter the community without additional precautions. Any non-residents of the community (e.g., guests, contractors, employees) would be assigned BLE beacons with designated access levels. For instance, for a landscaping contractor working at a specific residence, the security officer may attach a BLE beacon to his or her work vehicle. The beacon can be programmed with an access identifier configured to trigger an alert to the security guard if the contractor comes in proximity of a beacon reader known to be positioned away from the specific residence. Similarly, if a real estate agent is selling houses in a particular part of the gated community, the security officer can assign the agent a BLE beacon having an access identifier for that particular part of the community. The security officer would be notified if the real estate agent enters a part of the community other than the area designed for their employment. Authorization access identifiers can be adapted for the particular guest, employee, contractor, etc. entering the gated community.

IV. Location Monitoring and Tracking of Persons and/or Assets

Another exemplary application of the present invention is use for monitoring a particular room or area and tracking individual persons and/or assets within that area. In this embodiment, a beacon reader is positioned in a room or area to be managed. An administrative user accompanies a network-connected computing device with a display capable of accessing the user interface and a plurality of BLE beacons. The administrative user assigns identifying information to the beacon reader based on the room or area to be managed via the user interface. This beacon reader information may include floor number, room number, etc. The administrative user further sets the particular data to be captured and events to be triggered by the beacons when in proximity of the beacon reader. Such data may include the time a BLE beacon was first in range of the beacon reader, elapsed time in range of the beacon reader, and time when the beacon left range of the beacon reader. An example event trigger could be to set the beacon reader to send an alert to the user interface if a specific elapsed time limit of a BLE beacon in range of the beacon reader has been exceeded. Stationary BLE beacons may also be placed in and assigned to the area to be managed for an added level of granularity. For instance, if two or more stationary beacons are present, a beacon reader can determine the approximate location of a given BLE beacon by triangulation of the ratios of received signal strength indication (RSSI) values to each stationary beacon.

The administrative user assigns identifying information to a BLE beacon to be assigned to a person or asset intended to be tracked within the managed area. This identifying information may include, but is not limited to, first and last name of the person, serial or identification number of the asset, purpose for entering the managed area, position of employment, and/or type of equipment. If a person is to be tracked, the administrative user instructs the person to carry the beacon on their person at all times. If an asset is being tracked, the administrative user attaches the beacon to the asset. The person or asset can then enter the managed area, and the person or asset can be tracked by the administrative user via the user interface.

An example application of the present invention for location monitoring and tracking is for use in a hospital setting. A hospital room can be equipped with a beacon reader and several stationary BLE beacons. Stationary beacons can be placed on hospital beds, in the bathroom, and on any other stationary object or area to be monitored. A patient is assigned a BLE beacon, designed to be mobile, to be worn for the duration of his or her hospital stay. The beacon reader determines the RSSI value of the patient beacon as well as the RSSI values of the known stationary beacons. Based on the changing RSSI value of the patient beacon and the ratios of RSSI values of the stationary beacons, the beacon reader can determine the approximate location of the patient within a specific area of the room, and this data is sent in real time to the database and shown on the user interface. A supervising nurse can monitor this data on a network-connected computing device with a display. The beacon reader also captures historical location data based on proximity to a stationary beacon, such as first time in proximity and elapsed time. Nurses, doctors, and/or hospital equipment may also be assigned mobile BLE beacons to track their locations and elapsed time at a particular location. The present example embodiment aids in providing added patient safety and proper and efficient patient care.

Further applications of the present invention could include proximity-based worksite check-ins; construction site management with beacon-enabled hardhats or other wearable beacons for increased safety and efficiency; home healthcare and hospice to help ensure quality service and reduce fraud; property operations management; real-time alerts and information for teachers and parents about their students; tracking livestock; tracking employee efficiency; and many others. The aforementioned embodiments are not intended to be limiting. It is to be understood that the invention can be embodied in various forms and is not to be limited to the examples specifically discussed. The range of components and configurations which can be utilized in the practice of the present invention is virtually unlimited.

Having thus described the invention, what is claimed as new and desired to be secured by Letters Patent is:

1. A system for creating a smart environment comprising:
a reader device having a processor, a network connectivity module, a radio frequency (RF) module, and a Wi-Fi module extension;
said RF module being configured for receiving and transmitting RF signals;
said Wi-Fi module extension being configured for receiving and transmitting Wi-Fi signals;
said network connectivity module being configured for connecting said reader device to a computer network;
a remote, network-connected database connected to said reader device via said computer network;
a real time analytics engine connected to said database and said reader device via said computer network;
said real time analytics engine being configured for allowing real time, bidirectional communication and information exchange between said reader device and said database and for performing real time analysis of data from said reader device;
a remote, network-connected computing device connected to said database, said real time analytics engine, and said reader device via said computer network;
said computing device including a processor and a display configured for displaying a user interface;
wherein said reader device has a scanning radius;
said reader device being configured for identifying a unique identifier of any RF transmitting device within said scanning radius;
said reader device being configured for identifying a media access control (MAC) address of any Wi-Fi transmitting device within said scanning radius;
said reader device being configured for sending said RF transmitting device unique identifier and said Wi-Fi transmitting device MAC address to said database and said real time analytics engine via said computer network in real time;
said database being configured for storing data from said reader device; and
said user interface being configured for displaying data from said reader device and said real time analytics engine in real time.

2. The system according to claim 1, further comprising:
a set of mobile RF transmitting devices each configured for transmitting RF signals;
wherein said user interface is configured for programming each said mobile RF transmitting device with identifying information;
wherein said reader device is configured for identifying said mobile RF transmitting device identifying information of each said mobile RF transmitting device and tracking each said mobile RF transmitting device within said scanning radius; and
wherein said reader device is configured for sending said mobile RF transmitting device identifying information and tracking data to said database and said real time analytics engine via said computer network in real time.

3. The system according to claim 2, wherein:
said user interface is configured for setting proximity-based triggers for each said mobile RF transmitting device based on the location of said mobile RF transmitting device within said reader device scanning radius; and
said user interface is configured for displaying an alert when one of said proximity-based triggers is triggered.

4. The system according to claim 2, wherein:
said set of mobile RF transmitting devices comprises a set of mobile Bluetooth beacons each configured for transmitting Bluetooth frequency signals; and
said reader device RF module comprises a Bluetooth module configured for receiving and transmitting Bluetooth frequency signals.

5. The system according to claim 1, wherein:
said user interface is configured for assigning identifying information to said reader device.

6. The system according to claim 1, wherein:
said reader device network connectivity module comprises one from the group consisting of: a Wi-Fi connectivity module, an Ethernet port, a GSM module, a LTE module, and a cellular data chip.

7. The system according to claim 1, wherein:
said computing device comprises one from the group consisting of: a laptop computer, a desktop computer, a smart phone, and a tablet.

8. The system according to claim 7, wherein:
said user interface comprises a web interface configured to be opened in a web browser.

9. The system according to claim 7, wherein:
said user interface comprises a mobile application.

10. A method of creating a smart environment, including a reader device having a processor, a network connectivity module, a RF module, and a Wi-Fi module extension; a remote, network-connected database connected to the reader device via a computer network and configured for storing data from the reader device; a real time analytics engine connected to the database and the reader device via the computer network; the real time analytics engine being configured for allowing real time, bidirectional communication and information exchange between the reader device and the database and for performing real time analysis of data from the reader device; a remote, network-connected computing device connected to the database, the real time analytics engine, and the reader device via the computer network; the computing device including a processor and a display configured for displaying a user interface, the method comprising the steps of:
placing said reader device in a desired area;
said reader device identifying a unique identifier of any RF transmitting device within its scanning radius;
said reader device identifying a MAC address of any Wi-Fi transmitting device within its scanning radius;
said reader device sending said RF transmitting device unique identifier and said Wi-Fi transmitting device MAC address to said database and said real time analytics engine via said computer network in real time;
said database storing data from said reader device;
said real time analytics engine analyzing data from said reader device; and
said user interface displaying data from said reader device and said real time analytics engine in real time.

11. The method according to claim 10, further including a set of mobile RF transmitting devices each configured for transmitting RF signals, the method further comprising the steps of:
programming each said mobile RF transmitting device with identifying information via said user interface;
said reader device identifying said identifying information of each said mobile RF transmitting device and tracking each said mobile RF transmitting device within its scanning radius; and
said reader device sending said mobile RF transmitting device identifying information and tracking data to said database and said real time analytics engine via said computer network in real time.

12. The method according to claim 11, further comprising the steps of:
setting proximity-based triggers for each said mobile RF transmitting device based on the location of said mobile RF transmitting device within the scanning radius of said reader device via said user interface; and
said user interface displaying an alert when any said proximity-based trigger is triggered.

13. The method according to claim 11, further comprising the step of:
attaching each said mobile RF transmitting device to a mobile person or asset entering said environment.

14. The method according to claim 11, wherein:
said set of mobile RF transmitting devices comprises a set of mobile Bluetooth beacons each configured for transmitting Bluetooth frequency signals; and
said reader device RF module comprises a Bluetooth module configured for receiving and transmitting Bluetooth frequency signals.

15. The method according to claim 10, further comprising the step of:
assigning identifying information to said reader device via said web interface.

16. A method of managing a smart environment via a user interface, the smart environment including a reader device having a processor, a network connectivity module, and a RF module; a remote, network-connected database connected to the reader device via a computer network and configured for storing data from the reader device; a real time analytics engine connected to the database and the reader device via the computer network; the real time analytics engine being configured for allowing real time, bidirectional communication and information exchange between the reader device and the database and for performing real time analysis of data from the reader device; a remote, network-connected computing device connected to the database, the real time analytics engine, and the reader device via the computer network; the computing device including a processor and a display configured for displaying a user interface, the method comprising the steps of:
opening said user interface on said computing device;
said database checking data storage for known identifying information of said reader device;
if no known identifying information of said reader device, said user interface displaying a reader device identifying information setup form;
if said reader device identifying information setup form is displayed, assigning identifying information to said reader device via said user interface;
said reader device identifying a unique identifier of any RF transmitting device within its scanning radius;
said reader device sending said RF transmitting device unique identifier to said database via said computer network in real time;
said database checking data storage for known identifying information associated with said RF transmitting device unique identifier;
if no known identifying information associated with any particular RF transmitting device unique identifier, said user interface displaying a RF transmitting device identifying information setup form;
if said RF transmitting device identifying information setup form is displayed, assigning identifying information to said particular RF transmitting device via said user interface;
said reader device identifying RF transmitting device identifying information and tracking said RF transmitting device within its scanning radius;
said reader device sending said RF transmitting device identifying information and tracking data to said database and said real time analytics engine in real time;
said database storing data from said reader device;
said real time analytics engine analyzing data from said reader device; and
said user interface displaying data from said reader device and said real time analytics engine in real time.

17. The method according to claim 16, the reader device further including a Wi-Fi module extension, the method further comprising the steps of:
said reader device identifying a MAC address of any Wi-Fi transmitting device within its scanning radius; and
said reader device sending said Wi-Fi transmitting device MAC address to said database and said real time analytics engine in real time.

18. The method according to claim 16, further comprising the steps of:
setting proximity-based triggers associated with particular RF transmitting devices via said RF transmitting device identifying information setup form on said user interface; and
said user interface displaying an alert if any said proximity-based trigger has been triggered.

* * * * *